Oct. 10, 1950  H. M. BACON  2,525,196
INDUSTRIAL TRUCK TIRE
Filed Jan. 19, 1945  2 Sheets-Sheet 1
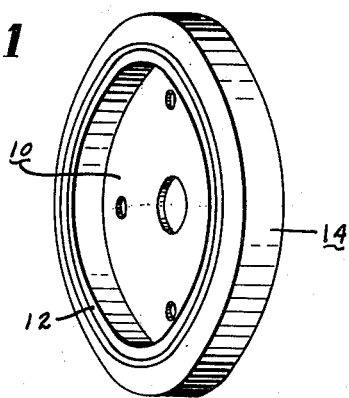
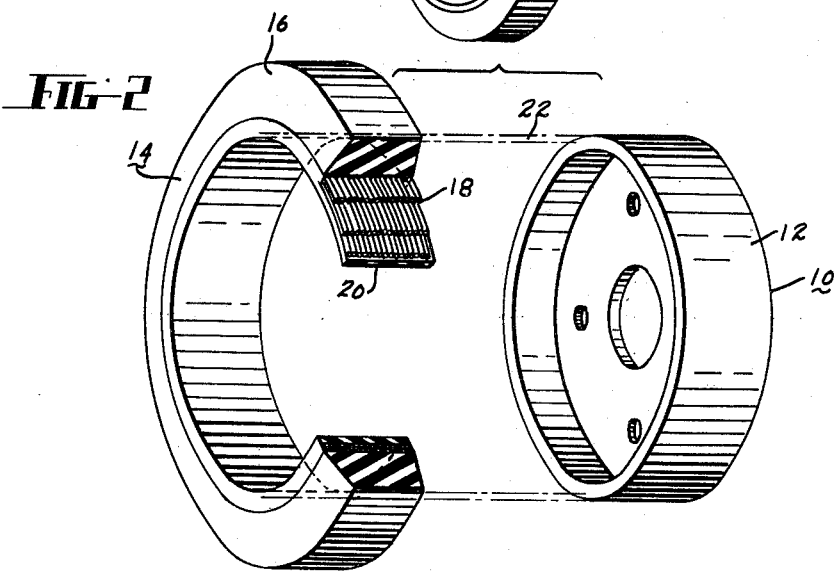
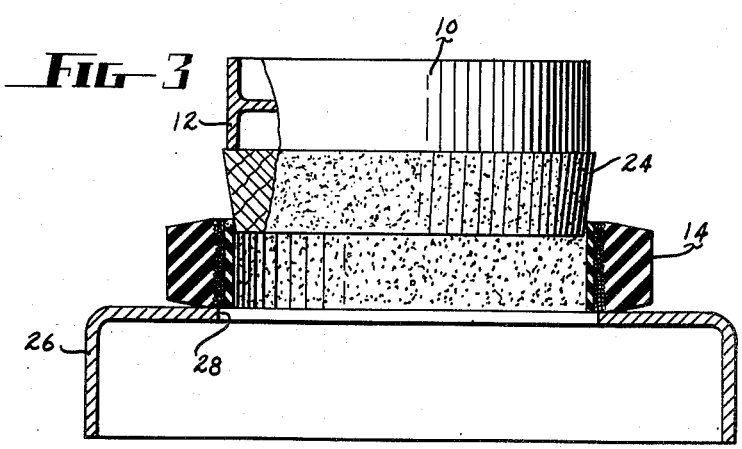
INVENTOR
HENRY M. BACON
BY
*Toulmin & Toulmin*
ATTORNEYS Oct. 10, 1950     H. M. BACON     2,525,196
INDUSTRIAL TRUCK TIRE
Filed Jan. 19, 1945     2 Sheets-Sheet 2
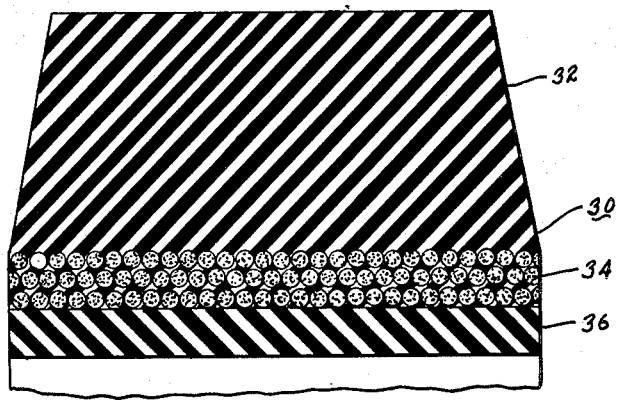
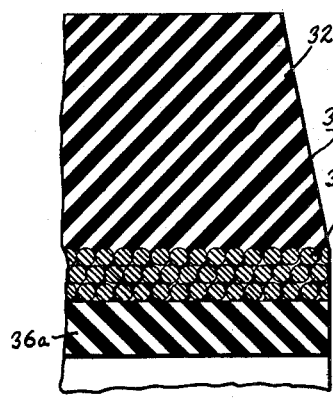 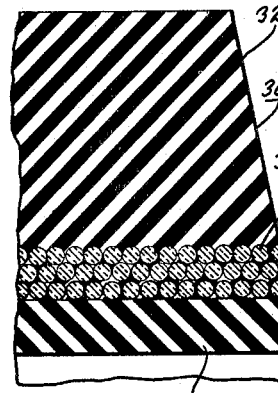 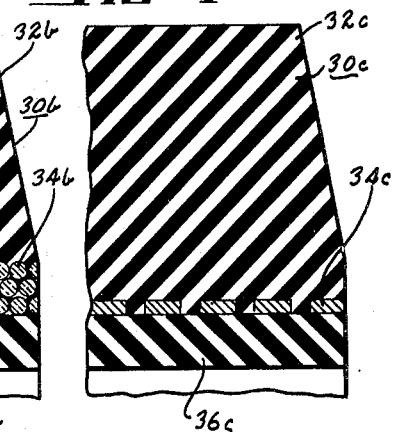
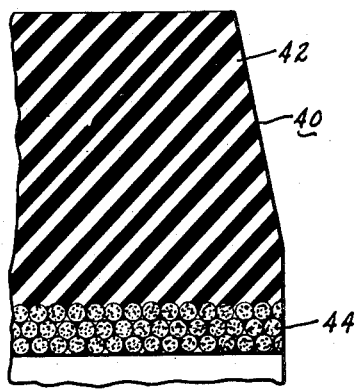
INVENTOR
HENRY M. BACON
BY
*Toulmin & Toulmin*
ATTORNEYS

UNITED STATES PATENT OFFICE 2,525,196

INDUSTRIAL TRUCK TIRE

Henry M. Bacon, Dayton, Ohio, assignor to The Dayton Rubber Company, a corporation of Ohio Application January 19, 1945, Serial No. 573,559

7 Claims. (Cl. 152—323)

This invention relates to wheel coverings and, particularly, to wheel coverings or tires for industrial trucks, trailers, etc. In many industries and factories a large number of trucks and push carts are used to transport material from place to place. These trucks are often fitted with uncushioned wheels so that not only is the material being transported in danger of being harmed, but also the factory flooring is subjected to severe loads.

It is an object of this invention to provide a tire for truck wheels such as referred to above which is readily mounted on the said wheel and which has relatively long life after installation.

Other industrial vehicles are equipped with cushioned wheels but in most of these cases the tire is so mounted on the wheel that in order to replace the same the wheel must be returned to the maker for re-tiring.

Accordingly, it is another object of this invention to provide a tire for industrial vehicles and a method of applying the same thereto which facilitates the re-tiring of wheels by the user.

It is another object to provide a tire construction for industrial vehicles such that the tire tightly embraces the said wheel when mounted thereon.

It is another object to provide a tire construction such that the tire has sufficient stretch to accommodate several sizes of wheels, thereby reducing the number of tire sizes necessary to supply the tread.

It is another object to provide an industrial truck tire which is resistant to extremes in temperature and to abrasions and oil.

These and other objects and advantages will become more apparent upon reference to the accompanying drawings, in which:

Figure 1 is a perspective view of a typical truck wheel having a tire mounted thereon;

Figure 2 is a perspective view of the wheel and tire before the mounting of the latter and showing the tire partly broken away;

Figure 3 is a view illustrating the method and apparatus for assembling the wheel and tire.

Figures 4 to 8, inclusive, are views of various tire constructions.

Referring to the drawings more in detail, the truck wheel is indicated at 10 and comprises the substantially flat cylindrical rim 12 on which a tire 14 is mounted.

The tire 14 comprises a tread or outer section 16 and a tension section 18. Optionally, the tire may also comprise a cushion section at 20 beneath the tension section 18. As indicated by the dotted lines at 22, the inner diameter of the unmounted tire is somewhat smaller than the diameter of the flange 12 from the wheel 10. Thus, when the tire is positioned around the wheel the difference in the diameters causes the tire tightly to embrace the said wheel.

In Figure 3 one form of apparatus for mounting the tire on the wheel is shown. The tire 14 has its inner surface coated with shellac or any other suitable adhesive which will assist in retaining the tire on the wheel and which also seals the join line of the wheel and tire against moisture, oil and dirt.

A block 24, which may be of wood, is provided and comprises a truncated cone, the smaller diameter of which will fit within the tire opening and the larger diameter of which is somewhat greater than the diameter of the wheel.

A member 26 is provided which has an aperture 28 therein of somewhat greater diameter than the larger diameter of the member 24. The apparatus is arranged as shown in Figure 3 with the tire 14 resting on the member 26 around the aperture 28. The block 24 is placed in the tire opening with the smaller diameter down and the wheel 10 is placed on top of the member 24. The member 24 and the inner surface of the tire 14 are coated with the aforementioned adhesive which serves during assembly as a lubricant.

To assemble the wheel within the tire, force is applied to the wheel which causes the member 24 to slide into the tire thus spreading it open so that the wheel will easily pass therein. The wheel and block are moved downwardly until the latter falls out the bottom of the tire and through the aperture 28, at which time the wheel is properly positioned within the said tire. The assembly is then ready for mounting on the vehicle on which it is to be used.

In Figure 4 is illustrated the preferred form of tire construction. This view shows a tire 30 which has a tread portion 32, a tension section 34 and a base portion 36.

The base portion 36 comprises live, rather soft rubber or rubber-like composition and the tension section 34 comprises a plurality of cords which have a small amount of stretch. The combination of the low stretch cords and the cushion layer thereunder provide for a certain amount of expansion of the inner diameter of the tire in order to insert the wheel, but also provide for a strong gripping of the wheel by the tire. Thus, the construction illustrated in Figure 4 may be mounted on and satisfactorily adhere to any wheel within predetermined size limits.

In Figures 5, 6 and 7, similar constructions are shown and similar parts are numbered correspondingly except with the addition of subscripts a, b and c, respectively.

Figure 5 shows that the tension section 34a may be comprised of wires or cables. In this case a certain amount of stretch is sacrificed in order to gain greater strength in the tension section.

In Figure 6 it will be seen that the tension section 34b may be comprised of glass fibers or cords while in Figure 7 the tension section 34c comprises metal bands or a metal band having apertures therethrough which permit the fusing of the tread section 34c with the cushion section 36c.

Referring to Figure 8, there is shown a modified construction wherein the inner cushion layer is eliminated. In Figure 8 the tire 40 comprises a tread section 42 and an inner tension section 44 which preferably comprises cords or cables having a predetermined amount of stretch. These cords are preferably selected cords such as are used in the casing of a pneumatic tire. This method of constructing tires is preferable for small tires and where it is necessary that the thickness of the tire remain small in order that the tire will have sufficient clearance when mounted on the vehicle.

In the manufacture of a tire according to this invention a mandrel or drum is employed on which the tire is built and cured.

In the manufacture of a tire the following steps represent the preferred process. The drum is first soaped and dried. The base layer of the tire is applied thereto followed by the tension section and thereafter the tread portion is applied. The drum is preferably long enough so that the material built up thereon is sufficient for a plurality of tires.

Following the applying of the tread, the drum is wrapped and cured under heat and pressure, usually by steam or water. After the curing step, the resulting sleeve is ground or machine worked to the proper size and surface texture and is then cut into individual tires which are removed from the drum and are then ready to be mounted on a wheel.

While no specific composition has been herein set forth, it will be understood that the rubberlike portion of the tire may comprise a compound of rubber or a suitable synthetic rubber compound such as a copolymer of butadiene.

It will be also understood that my invention is not limited to the exact details of construction as shown in the drawings and described but that various modifications may be made by those skilled in the art without departing from the spirit of my invention.

I claim:

1. A tire assembly comprising in combination, a wheel having a predetermined outer diameter, and a tire connected to said wheel by friction only, said tire including an outer tread section, an adjacent tension section with cords of low stretch mounted therein, and a base or cushion section of soft rubber composition, the inner diameter of said base section prior to the mounting thereof on said wheel being materially smaller than the outer diameter of said wheel.

2. A tire assembly comprising in combination, a wheel having a predetermined outer diameter, and a tire connected to said wheel by friction, said tire including an outer tread section, an adjacent tension section comprising a longitudinally arranged tension member mounted therein, and a base or cushion section of soft rubber composition, the inner diameter of said base section prior to the mounting thereof on said wheel being materially smaller than the outer diameter of said wheel.

3. A tire assembly according to claim 2 wherein the tension section comprises a plurality of longitudinally arranged tension members formed of wire.

4. A tire assembly according to claim 2 wherein the tension member comprises glass fibers.

5. A tire assembly comprising in combination, a wheel with a circumferential flange having a predetermined outer diameter, a tire positioned around and firmly engaging said flange, said tire including an outer rubber tread section and an inner rubber section adjacent said flange comprising a longitudinal circumferentially extending reinforcing member embedded therein, the inner diameter of said inner section prior to mounting thereof on said wheel being materially smaller than the outer diameter of the flange, said inner section having a predetermined amount of resiliency and stretchability to permit stretching and mounting of said tire on said wheel, said tire being mounted upon and firmly engaging said flange while in a stretched condition.

6. A tire assembly according to claim 5 wherein the inner section comprises a plurality of parallel circumferentially arranged cords having a predetermined amount of stretch sufficient to permit stretching of the inner section and mounting upon the wheel.

7. A tire assembly according to claim 2 wherein the tension member is in the form of a metal band.

HENRY M. BACON.

REFERENCES CITED

The following references are of record in the file of this patent:

UNITED STATES PATENTS

| Number | Name | Date |
|---|---|---|
| 601,088 | Verel | Mar. 22, 1898 |
| 844,821 | Marks | Feb. 19, 1907 |
| 908,475 | Midgley | June 5, 1909 |
| 1,016,472 | Buckwalter | Feb. 6, 1912 |
| 1,021,422 | Mell | Mar. 26, 1912 |
| 1,145,063 | Hale | July 6, 1915 |
| 2,228,086 | Rodgers | Jan. 7, 1941 |